United States Patent
Lee et al.

(10) Patent No.: US 12,425,625 B2
(45) Date of Patent: *Sep. 23, 2025

(54) DISPLAY APPARATUS AND METHOD OF CONTROLLING THE SAME USING ARTIFICIAL INTELLIGENCE (AI)

(71) Applicant: SAMSUNG ELECTRONICS CO., LTD., Suwon-si (KR)

(72) Inventors: Sangjo Lee, Suwon-si (KR); Sangkwon Na, Suwon-si (KR); Doohyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,714

(22) Filed: Apr. 2, 2024

(65) Prior Publication Data

US 2024/0251094 A1    Jul. 25, 2024

Related U.S. Application Data

(63) Continuation of application No. 17/671,070, filed on Feb. 14, 2022, now Pat. No. 11,968,382, which is a
(Continued)

(30) Foreign Application Priority Data

Nov. 12, 2018   (KR) .................. 10-2018-0138373

(51) Int. Cl.
*H04N 19/44*    (2014.01)
*G06N 5/02*     (2023.01)
*H04N 19/80*    (2014.01)

(52) U.S. Cl.
CPC ............ *H04N 19/44* (2014.11); *G06N 5/02* (2013.01); *H04N 19/80* (2014.11)

(58) Field of Classification Search
None
See application file for complete search history.

(56) References Cited

U.S. PATENT DOCUMENTS 7,630,576 B2   12/2009  Kondo
8,204,128 B2    6/2012  Huchet
(Continued)

FOREIGN PATENT DOCUMENTS

CN    107925762 A    4/2018
EP      3471414 A1   4/2019
(Continued)

OTHER PUBLICATIONS

Communication dated Oct. 29, 2020 from the European Patent Office in application No. 19207013.4.
(Continued)

*Primary Examiner* — Chikaodili E Anyikire
(74) *Attorney, Agent, or Firm* — Sughrue Mion, PLLC

(57) ABSTRACT

Disclosed are a display apparatus and a method of controlling the same, the display apparatus including: a video decoder configured to decode a video signal; and an artificial intelligence (AI) scaler including a plurality of filters provided to make an output of a certain filter be used as an input of another filter, and configured to control a resolution of an image by processing the decoded video signal, each of the plurality of filters being selectively turned on or off based on a control signal, the filter being turned on processing the video signal based on a parameter set by learning, and the filter being turned off bypassing and outputting the input video signal.

16 Claims, 13 Drawing Sheets

Related U.S. Application Data continuation of application No. 16/680,974, filed on Nov. 12, 2019, now Pat. No. 11,265,564.

(56) References Cited

U.S. PATENT DOCUMENTS

| | | | |
|---|---|---|---|
| 8,472,745 | B2 | 6/2013 | Kameyama |
| 8,964,853 | B2 | 2/2015 | Chong |
| 10,123,050 | B2 | 11/2018 | Karczewicz |
| 11,403,738 | B2 * | 8/2022 | Watanabe ............... H04N 7/01 |
| 2007/0172152 | A1 | 7/2007 | Altunbasak et al. |
| 2009/0028458 | A1 | 1/2009 | Teng et al. |
| 2009/0034622 | A1 | 2/2009 | Huchet |
| 2009/0316048 | A1 | 12/2009 | Rumreich et al. |
| 2010/0027686 | A1 | 2/2010 | Zuo |
| 2010/0118161 | A1 | 5/2010 | Tsurumi |
| 2011/0200270 | A1 | 8/2011 | Kameyama |
| 2014/0067739 | A1 | 3/2014 | Hombs et al. |
| 2016/0321523 | A1 | 11/2016 | Sen et al. |
| 2017/0193680 | A1 | 7/2017 | Zhang et al. |
| 2017/0347110 | A1 | 11/2017 | Wang et al. |
| 2018/0192046 | A1 | 7/2018 | Teo et al. |
| 2018/0192068 | A1 | 7/2018 | Nam et al. |
| 2018/0220140 | A1 | 8/2018 | Jeong |
| 2018/0249158 | A1 | 8/2018 | Huang et al. |
| 2019/0052883 | A1 * | 2/2019 | Ikeda ................. H03M 7/6005 |
| 2019/0075301 | A1 * | 3/2019 | Chou ................. H04N 19/132 |
| 2019/0104308 | A1 | 4/2019 | Nishida et al. |
| 2019/0124327 | A1 | 4/2019 | Kawai et al. |
| 2019/0373261 | A1 | 12/2019 | Egilimez |
| 2020/0077120 | A1 | 3/2020 | Kawai et al. |
| 2021/0297687 | A1 | 9/2021 | Kawai et al. |

FOREIGN PATENT DOCUMENTS

| | | |
|---|---|---|
| JP | 2008-193712 A | 8/2008 |
| JP | 2009-524861 A | 7/2009 |
| KR | 10-2015-0135637 A | 12/2015 |
| KR | 10-2018-0009048 A | 1/2018 |
| TW | 200919374 A | 5/2009 |
| TW | 1388212 B | 3/2013 |
| WO | 2016132152 A1 | 8/2016 |
| WO | 2017144881 A1 | 8/2017 |
| WO | 2017/191749 A1 | 11/2017 |
| WO | 2017/191750 A1 | 11/2017 |
| WO | 2018/131524 A1 | 7/2018 |
| WO | 2018/168484 A1 | 9/2018 |
| WO | 2019/045883 A1 | 3/2019 |

OTHER PUBLICATIONS

Communication dated Mar. 30, 2020 from the European Patent Office in application No. 19207013.4.
Communication issued Mar. 17, 2023 by the Taiwan Intellectual Property Office in counterpart Taiwan Patent Application No. 108140585.
Communication issued by the European Patent Office on Mar. 31, 2023 for European Patent Application No. 19207013.4.
Communication issued Aug. 1, 2023 issued by Korean Patent Office in counterpart Korean Application No. 10-2018-0138373.
Communication dated May 20, 2021 issued by the European Patent Office in application No. 19207013.4.
Communication issued Jan. 2, 2023 by the Intellectual Property Office of India in counterpart Indian Patent Application No. 201944044984.
Communication dated Jun. 7, 2022, issued by the Japan Patent Office in counterpart Japanese Patent Application No. 2021-513901.
Communication issued Oct. 28, 2021 by the Australian Patent Office in Australian Patent Application No. 2019381040.
International Search Report (PCT/ISA/210) and Written Opinion (PCT/ISA/237) dated Feb. 27, 2020 from the International Searching Authority in counterpart application No. PCT/KR2019/015016.
Communication dated Jun. 24, 2024, issued by the China National Intellectual Property Administration in Chinese Application No. 201911098874.4.
Communication issued Mar. 10, 2025 by the China National Intellectual Property Administration in Chinese Patent Application No. 201911098874.4.

* cited by examiner

DISPLAY APPARATUS AND METHOD OF CONTROLLING THE SAME USING ARTIFICIAL INTELLIGENCE (AI)

CROSS-REFERENCE TO RELATED THE APPLICATION

This application is a Continuation Application of U.S. application Ser. No. 17/671,070 filed on Feb. 14, 2022, which is a Continuation Application of U.S. application Ser. No. 16/680,974 filed on Nov. 12, 2019 issued as U.S. Pat. No. 11,265,564 on Mar. 1, 2022, which is based on and claims priority under 35 U.S.C. § 119 to Korean Patent Application No. 10-2018-0138373 filed on Nov. 12, 2018 in the Korean Intellectual Property Office, the disclosures of which are incorporated by reference herein in their entireties.

BACKGROUND

Field

Apparatuses and methods consistent with the exemplary embodiments relate to a display apparatus and a method of controlling the same, and more particularly to a display apparatus, in which a video signal is processed based on artificial intelligence (AI) learning, a method of controlling the same, and a recording medium thereof.

Description of the Related Art

An artificial intelligence (AI) system refers to a computer system that has an intellectual ability of a human level, and also refers to a system that becomes smarter through self-machine learning and identification on the contrary to a conventional rule-based smart system. The AI system is more improved in a recognition rate and more accurately learns a user's preference as it is used more and more, and therefore the conventional rule-based smart system has been gradually replaced by the AI system based on AI learning.

AI technology includes machine learning, deep learning and the like learning-based processes, and elementary technologies using the learning.

The learning refers to algorithm technology that autonomously sorts/learns characteristics of input data, and the elementary technology refers technology that uses the deep learning and the like learning algorithm to mimic functions of a human brain such as recognition, determination, etc. and is classified into technical fields including language understanding, visual understanding, inference/prediction, knowledge representation, operation control, etc.

Various fields to which the AI technology is applied are as follows. The language understanding refers to technology that recognizes and applies/processes a human language/character, and includes natural language processing, machine translation, a dialog system, question and answer, voice recognition/synthesis, etc. The visual understanding refers to technology that recognizes and processes an object like human vision, and includes object recognition, object tracking, image search, human recognition, scene understanding, space understanding, image enhancement, etc. The inference/prediction refers to technology that and logically makes inference and prediction by identifying and includes knowledge/probability-based inference, optimization prediction, preference-based plan, recommendation, etc. The knowledge representation refers to technology that automatically processes human experience information into knowledge data, and includes knowledge construction (data generation/classification), knowledge management (data utilization), etc. The operation control refers to technology that controls automatic driving of a vehicle and motion of a robot, and includes motion control (e.g. navigation, collision, driving), operation control (e.g. action control), etc.

SUMMARY

In some embodiments, a display apparatus is provided herein, the display apparatus including a video decoder configured to decode a video signal; an artificial intelligence (AI) scaler, the AI scaler comprises a plurality of filters, and the AI scaler is configured to process the decoded video signal; and a controller configured to control a resolution of an image by selectively turning on or off, based on a control signal, each filter of a plurality of filters, a selected filter of the plurality of filters is turned on by the control signal and an unselected filter of the plurality of filters is turned off by the control signal, the selected filter, based on being turned on, is configured to process the video signal based on one or more first parameters, the one or more first parameters are based on a learning, and the learning includes arriving at the one or more first parameters by training, and the unselected filter, based on being turned off, is configured to bypass and output a signal input to the unselected filter.

In some embodiments, the display apparatus also includes a storage, the storage is configured to store a lookup table, the lookup table has been generated by performing the learning, and the controller is further configured to set the selected filter based on the one or more first parameters extracted from the lookup table.

In some embodiments of the display apparatus, the selected filter comprises a second plurality of filters, wherein each filter of the second plurality of filters is set with one or more second parameters, and the AI scaler is configured to pass the decoded video signal through the second plurality of filters in sequence.

In some embodiments of the display apparatus, the controller is further configured to: obtain codec information of the video signal from the video decoder, extract, based on the codec information, the one or more first parameters from the lookup table, and set the selected filter based on the one or more first parameters.

In some embodiments of the display apparatus, the codec information comprises at least one of a codec type and a compression rate.

In some embodiments of the display apparatus, the controller is further configured to cause the AI scaler to analyze, by a first filter, an image characteristic of the video signal, and process the decoded video signal by a second filter, the second filter is set with a third parameter corresponding to the analyzed image characteristic, the selected filter comprises the second filter, and the one or more first parameters comprise the third parameter.

In some embodiments of the display apparatus, the lookup table is based on the learning and the learning is based on characteristics of images, and the lookup table is configured to store the third parameter.

In some embodiments of the display apparatus, the selected filter comprises a third filter, the third filter is configured to perform post-processing with respect to the image, and the post-processing corresponds to at least one of noise reduction and detail enhancement.

In some embodiments of the display apparatus, the one or more first parameters are based on a first AI learning-based process, or the one or more first parameters are based on a second AI learning-based process.

In some embodiments of the display apparatus, each of the plurality of filters is controlled to be turned on or off based on a configuration control signal indicating one of the first AI learning-based process and the second AI learning-based process, and the AI scaler is controlled to use one of the first combination of filters and the second combination of filters to process the decoded video signal.

In some embodiments of the display apparatus, at least one filter among the plurality of filters belongs to the first combination of filters and the second combination of filters, and is shared between the first AI learning-based process and the second AI learning-based process.

Also provided herein is a method of controlling a display apparatus. In some embodiments, the method includes decoding a video signal; and controlling a resolution of an image by: selectively turning on or off, based on a control signal, each filter of a plurality of filters, wherein a selected filter of the plurality of filters is turned on by the control signal and an unselected filter of the plurality of filters is turned off by the control signal, and processing the decoded video signal through the plurality of filters, the selected filter, based on being turned on, is configured to process the video signal based on one or more first parameters, the one or more first parameters are based on a learning, and wherein the learning includes arriving at the one or more first parameters by training, and the unselected filter, based on being turned off, is configured to bypass and output a signal input to the unselected filter.

In some embodiments of the method of controlling a display apparatus, the selected filter comprises a second plurality of filters, wherein each filter of the second plurality of filters is set with one or more second parameters, and the controlling the resolution of the image further comprises passing the decoded video signal through the second plurality of filters in sequence.

In some embodiments of the method of controlling a display apparatus, the method includes storing a first lookup table, the first lookup table has been generated by performing the learning. Some embodiments of the method also include obtaining codec information of the video signal from a video decoder, extracting, based on the codec information, the one or more first parameters from the first lookup table, and setting the selected filter based on the one or more first parameters.

In some embodiments of the method of controlling a display apparatus, the method includes analyzing, by a first filter, an image characteristic of the video signal, wherein the processing the decoded video signal further comprises processing the decoded video signal by a second filter, wherein the second filter is set with a third parameter corresponding to the analyzed image characteristic, wherein the selected filter comprises the second filter, and wherein the one or more first parameters comprise the third parameter.

In some embodiments of the method of controlling a display apparatus, the method includes storing a second lookup table, wherein the second lookup table is based on the learning and wherein the learning is based on characteristics of images, the controlling the resolution of the image further comprises extracting the third parameter from the second lookup table.

In some embodiments of the method of controlling a display apparatus, the method includes performing, by a third filter, post-processing with respect to the image, wherein the post-processing corresponds to at least one of noise reduction and detail enhancement.

In some embodiments of the method, the one or more first parameters are based on a first Artificial Intelligence (AI) learning-based process, or the one or more first parameters are based on a second AI learning-based process.

In some embodiments of the method, the controlling the resolution of the image further comprises controlling each of the plurality of filters to be turned on or off based on a configuration control signal indicating one of the first AI learning-based process and the second AI learning-based process.

Also provided herein is a non-transitory computer readable medium storing instructions, the instructions to be performed by at least one processor, the instructions configured to cause the at least one processor to: decode a video signal; and control a resolution of an image by: selectively turning on or off, based on a control signal, each filter of a plurality of filters, wherein a selected filter of the plurality of filters is turned on by the control signal and an unselected filter of the plurality of filters is turned off by the control signal, and processing the decoded video signal through the plurality of filters, the selected filter, based on being turned on, is configured to process the video signal based on one or more first parameters, wherein the one or more first parameters are based on a learning, and wherein the learning includes arriving at the one or more first parameters by training, and the unselected filter, based on being turned off, is configured to bypass and output a signal input to the unselected filter.

According to an embodiment, there is provided a display apparatus including: a video decoder configured to decode a video signal; and an artificial intelligence (AI) scaler including a plurality of filters provided to make an output of a certain filter be used as an input of another filter, and configured to control a resolution of an image by processing the decoded video signal, each of the plurality of filters being selectively turned on or off based on a control signal, the filter being turned on processing the video signal based on a parameter set by learning, and the filter being turned off bypassing and outputting the input video signal.

The display apparatus may further include a storage configured to store a lookup table generated by previously performing the learning, and the filter being turned on may be set by the parameter extracted from the lookup table.

The filter being turned on may include a plurality of filters, each of which is set with a predetermined parameter, and the decoded video signal may pass through the plurality of filters being turned on in sequence to control the resolution of the image.

The display apparatus may further include: a storage configured to store a lookup table generated by previously performing the learning; and a controller configured to obtain codec information of the video signal from the video decoder, extract a parameter from the lookup table based on the obtained codec information, and set each of the plurality of filters being turned on based on the extracted parameter.

The codec information may include at least one of a codec type or a compression rate.

The filter being turned on may include a first filter configured to analyze an image characteristic of the video signal, and a second filter may be configured to be set with a parameter corresponding to the analyzed image characteristic and control the resolution of the image.

The display apparatus may further include: a storage configured to store lookup tables generated according to characteristics of images by previously performing the learning, and a controller configured to extract a parameter, which corresponds to the image characteristic analyzed by the first filter, from the lookup table, and set the second filter based on the extracted parameter.

The filter being turned on may include a third filter configured to perform post-processing corresponding to at least one of noise reduction or detail enhancement, with respect to the image of which the resolution is controlled by the second filter.

The AI scaler may be configured to: process the decoded video signal through a first combination of filters among the plurality of filters corresponding to a first AI learning-based process, or process the decoded video signal through a second combination of filters different from the first combination among the plurality of filters corresponding to a second AI learning-based process.

Each of the plurality of filters may be controlled to be turned on or off based on a configuration control signal indicating one of the first AI learning-based process and the second AI learning-based process, and the AI scaler may be controlled to use one of the first combination of filters and the second combination of filters to process the decoded video signal.

At least one filter among the plurality of filters may belong to the first combination of filters and the second combination of filters, and may be shared between the first AI learning-based process and the second AI learning-based process.

According to an embodiment, there is provided a method of controlling a display apparatus, including: decoding a video signal; and controlling a resolution of an image by processing the decoded video signal through a plurality of filters provided to make an output of a certain filter be used as an input of another filter, the controlling the resolution of the image including: selectively turning on or off each of the plurality of filters based on a control signal; by the filter being turned on, processing the video signal based on a parameter set by learning; and by the filter being turned off, bypassing and outputting the input video signal.

The filter being turned on may include a plurality of filters, each of which is set with a predetermined parameter, and the controlling the resolution of the image may include allowing the decoded video signal to pass through the plurality of filters being turned on in sequence to control the resolution of the image.

The method may further include storing a lookup table generated by previously performing the learning, and the controlling the resolution of the image may include: obtaining codec information of the video signal from a video decoder; and extracting a parameter from the lookup table based on the obtained codec information, and setting each of the plurality of filters being turned on based on the extracted parameter.

The controlling the resolution of the image may include: by a first filter, analyzing an image characteristic of the video signal; and by a second filter set with a parameter corresponding to the analyzed image characteristic, controlling the resolution of the image.

The method may further include storing lookup tables generated according to characteristics of images by previously performing the learning, the controlling the resolution of the image may include: extracting a parameter, which corresponds to the image characteristic analyzed by the first filter, from the lookup table; and setting the second filter based on the extracted parameter.

The controlling the resolution of the image may further include: by a third filter, performing post-processing corresponding to at least one of noise reduction or detail enhancement, with respect to the image of which the resolution is controlled by the second filter.

The controlling the resolution of the image may include processing the decoded video signal through a first combination of filters among the plurality of filters corresponding to a first AI learning-based process, or processing the decoded video signal through a second combination of filters different from the first combination among the plurality of filters corresponding to a second AI learning-based process.

The controlling the resolution of the image may include controlling each of the plurality of filters to be turned on or off based on a configuration control signal indicating one of the first AI learning-based process and the second AI learning-based process, so that the AI scaler can use one of the first combination of filters and the second combination of filters to process the decoded video signal.

According to an embodiment, there is provided a computer program product including: a memory configured to store a plurality of instructions; and a processor, wherein, when the instruction is executed by the processor, a video signal is decoded and a resolution of an image by processing the decoded video signal is controlled through a plurality of filters provided to make an output of a certain filter be used as an input of another filter, each of the plurality of filters selectively being turned on or off based on a control signal, the video signal being processed, by the filter being turned on, based on a parameter set by learning, and the input video signal bypassing and being output by the filter being turned off.

According to an embodiment, there is provided a computer-readable nonvolatile recording medium recorded with a program of a method executable by a processor of a display apparatus, the method including: decoding a video signal; and controlling a resolution of an image by processing the decoded video signal through a plurality of filters provided to make an output of a certain filter be used as an input of another filter, the controlling the resolution of the image including: selectively turning on or off each of the plurality of filters based on a control signal; by the filter being turned on, processing the video signal based on a parameter set by learning; and by the filter being turned off, bypassing and outputting the input video signal.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
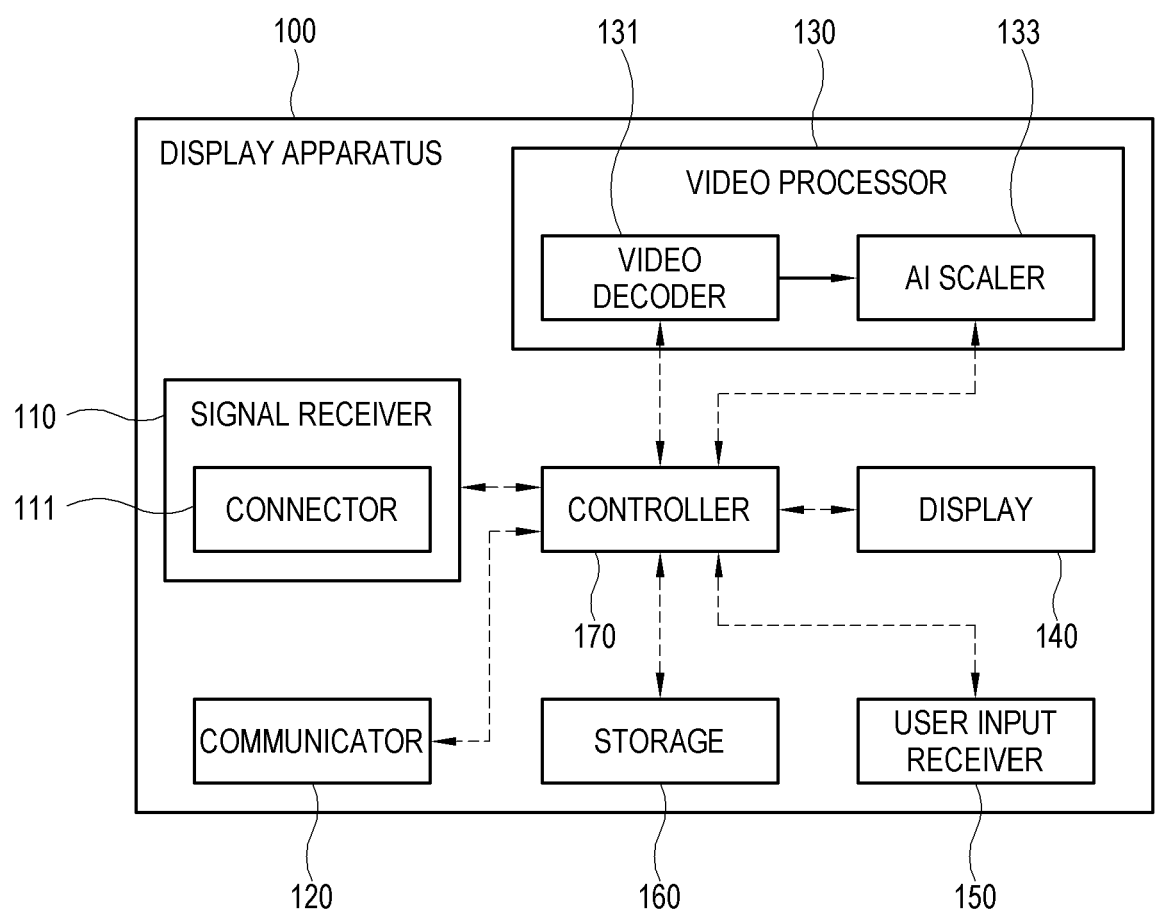
FIG. 1 is a block diagram of a display apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

Figure 2:
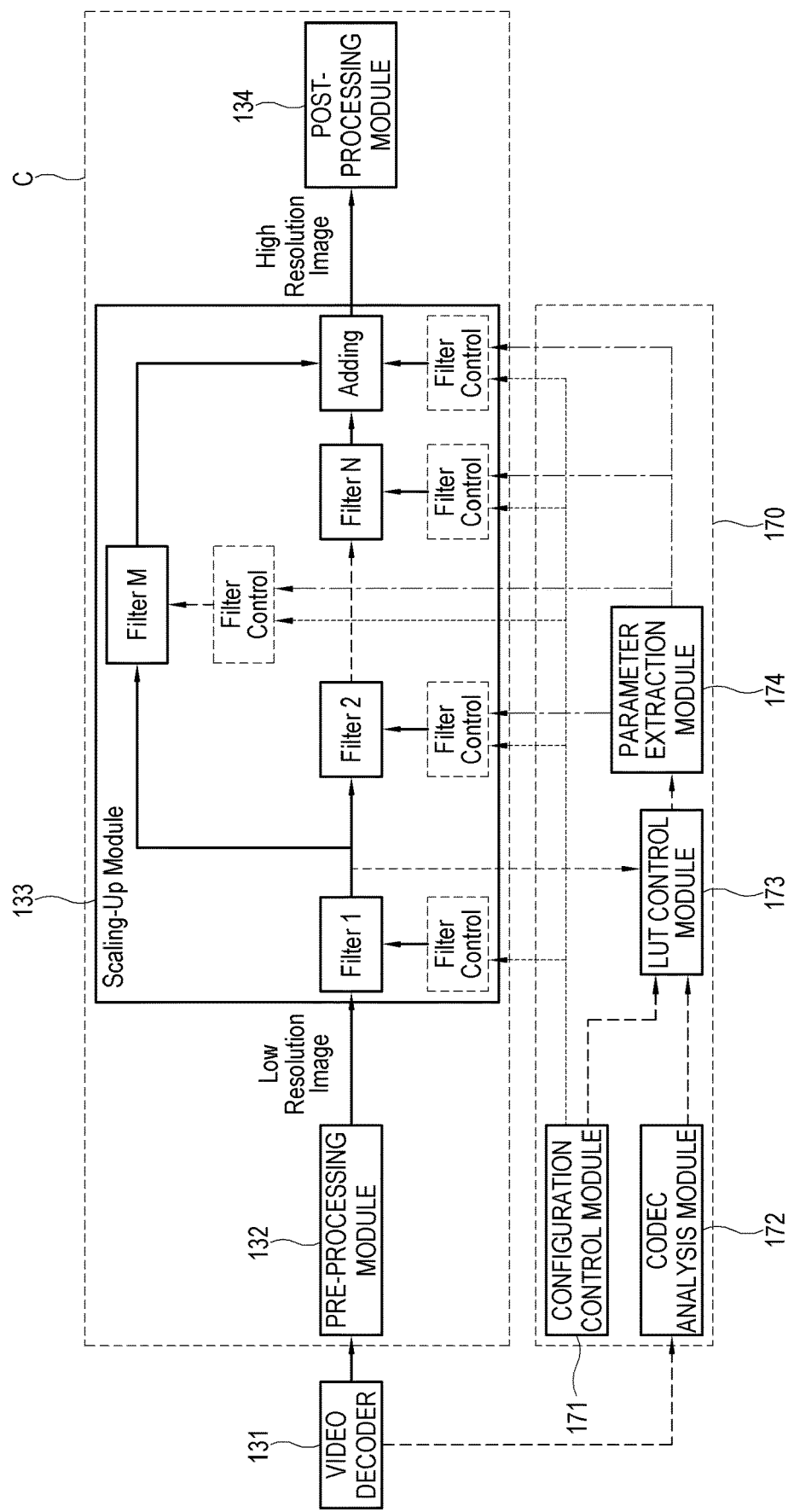
FIG. 2 is a block diagram of a detailed configuration for processing a video signal in a display apparatus according to an embodiment of the disclosure.

FIG. 1 is a block diagram of a display apparatus according to an embodiment of the disclosure, and FIG. 2 is a block diagram of a detailed configuration for processing a video signal in a display apparatus according to an embodiment of the disclosure.

A display apparatus 100 according to an embodiment of the disclosure processes an image signal provided from an external signal source, i.e. an image source (not shown) under a preset process and displays an image based on the processed image signal.

According to an embodiment, the display apparatus 100 may include a television (TV) or the like display apparatus that processes a broadcast image based on at least one of a broadcast signal, broadcast information or broadcast data received from a transmitter of a broadcasting station.

The display apparatus 100 may for example wirelessly receive a radio frequency (RF) signal, i.e. a broadcast signal from the broadcasting station. To this end, the display apparatus 100 may include an antenna configured to receive a broadcast signal, and a tuner configured to be tuned to a channel corresponding to a broadcast signal. The display apparatus 100 may receive the broadcast signal through a terrestrial wave, a cable, a satellite, etc. and a signal source according to the disclosure is not limited to the broadcasting station. In other words, the signal source of the disclosure may include any apparatus or station capable of transceiving or relaying data, like a set-top box, and a player for reproducing an optical disc such as a Blu-ray disc (BD), a digital versatile disc (DVD), etc.

Standards for a signal received in the display apparatus 100 may be variously given corresponding to the types of the apparatus, and an image signal may for example be received based on a high definition multimedia interface (HDMI), composite video, component video, super video, Syndicat des Constructeurs d'Appareils Radiorécepteurs et Téléviseurs (SCART), universal serial bus (USB), etc. by a wire. Further, the display apparatus 100 may wirelessly receive an image signal through wireless communication such as Wi-Fi, Wi-Fi direct, or Bluetooth.

Further, the display apparatus 100 may perform a signal process to display thereon a moving image, a still image, an application, an on-screen display (OSD), a user interface (UI, hereinafter also referred to as a graphic user interface (GUI)) for various operation controls, etc. based on a signal/data stored in an internal/external storage medium.

According to an embodiment, the display apparatus 100 may operate as a smart TV or Internet protocol (IP) TV. The smart TV refers to a TV that is capable of obtaining and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example include applications for providing services such as social network service, finance, news, weather, a map, music, a movie, a game, an electronic book, etc.

However, the display apparatus 100 of the disclosure is not limited to the TV, and may for example include various apparatuses such as a laptop or desktop personal computer (PC) (or a monitor connected to the computer), etc.

The display apparatus 100 according to an embodiment of the disclosure, as shown in as shown in FIG. 1, includes a signal receiver 110, a communicator 120, a video processor 130, a display 140, a user input receiver 150, a storage 160, and a controller 170.

The signal receiver 110 receives an image signal (i.e. content) from the outside and delivers the received image signal to the video processor 130. The signal receiver 110 may receive the image signal wirelessly using a radio receiver equipped with a modem. Or the signal may be received through a wired connection as described below. The standards of the received signal may be varied depending on the types of the display apparatus 100. For example, the signal receiver 110 may receive a radio frequency (RF) signal from a broadcasting station (not shown) wirelessly, or may receive an image signal complying with standards such as composite video, component video, super video, SCART, HDMI, etc. by a wire.

The signal receiver 110 includes a connector 111 via which the display apparatus 100 connects with the external image source by a wire. According to an embodiment, an HDMI cable is used in connection between the connector 111 and the image source, but the connection standards are not limited to the HDMI.

The display apparatus 100 may receive content from a set-top box or the like image source connected by a wire through the connector 111. The connector 111 basically receives a signal from the image source, but may interactively transmit and receive a signal.

The connector 111 may be actualized by a communication circuitry including a data input/output interface where communication modules (a S/W module, a chip, etc.), ports, etc. are combined corresponding to various communication protocols.

According to an embodiment, an apparatus connected to the display apparatus 100 by a wire through the connector 111 is a set-top box, a PC or the like image source, but the disclosure is not limited to this embodiment. For example, a display apparatus 100 according to an alternative embodiment may connect with a mobile apparatus by a wire through the connector 111.

According to an embodiment, the signal receiver 110 may include a tuner to be tuned to a channel corresponding to a broadcast signal when the image signal is the broadcast signal.

Further, the image signal may be output from various peripheral apparatuses. Further, the image signal may be based on data received through the Internet or the like network. In this case, the display apparatus 100 may receive an image signal through the communicator 120 (to be described later).

Further, the image signal may be based on data stored in a nonvolatile storage 160 such as a flash memory, a hard disk drive (HDD), etc. The storage 160 may be provided inside or outside the display apparatus 100. In a case where the storage 160 is provided outside the display apparatus 100, the storage 160 may be connected to the display apparatus 100 through the connector 111.

According to an embodiment, the signal receiver 110 may receive a video signal as content, which is encoded by a artificial intelligence (AI) learning-based process at an encoding terminal of a signal source, i.e. a content providing apparatus.

The communicator 120 is configured to communicate with at least one external apparatus by a wire or wirelessly. The communicator 120 includes a wired and/or wireless communication module.

The communicator 120 may be actualized by a communication circuitry including communication modules (a S/W module, a chip, etc.) corresponding to various communication protocols.

According to an embodiment, the communicator 120 includes a wireless local area network (WLAN) unit. The WLAN unit may deliver a signal to at least one apparatus targeted for control through an access point (AP) under control of the controller 170. The WLAN unit includes Wi-Fi communication module.

According to an embodiment, the communicator 120 includes at least one of modules for short-range communication such as Bluetooth, Bluetooth low energy, RF communication, Wi-Fi Direct, Zigbee, ultrawideband (UWB), near field communication (NFC), infrared data association (IrDA) communication, etc. The short-range communication module is configured to wirelessly support direct communication between the display apparatus 100 and at least one apparatus without the AP.

According to an embodiment, the communicator 120 may further include a wired communication module such as Ethernet, etc.

The communicator 120 of the display apparatus 100 according to an embodiment of the disclosure may be actualized by one among the WLAN unit, the short-range communication module, and the wired communication module or combination of two among them according to required performance. The term "embodiments . . . actualized by . . . ," as used herein, includes the meaning of "example embodiments may be based on . . . ."

According to an embodiment, the display apparatus 100 performs wireless communication with at least one external apparatus through the communicator 120. When the display apparatus 100 directly performs the wireless communication with at least one external apparatus, the storage 160 may be configured to store identification information (for example, a media access control (MAC) address or an Internet protocol (IP) address) about the apparatus targeted for communication.

The video processor 130 performs various preset video/audio processes with regard to an image signal received from at least one of the signal receiver 110 or the communicator 120. The video processor 130 outputs a signal generated or combined by such an image processing process to the display 140, thereby making the display 140 display an image based on the image signal.

The video processor 130, as shown in FIG. 1, includes a video decoder 131, and an AI scaler 133.

The video decoder 131 decodes the image signal to corresponding to an image format of the display apparatus 100. The video decoder 131 may for example be an H.264 decoder, but is not limited to this example. In other words, the video decoder 131 according to an embodiment of the disclosure may be actualized by decoders complying with various compression standards, such as a moving picture experts group (MPEG) decoder, a high efficiency video codec (HEVC) decoder, etc.

The AI scaler 133 performs scaling to adjust or convert an image signal according to the output standards of the display 140.

In the display apparatus 100 according to an embodiment of the disclosure, the AI scaler 133 is actualized by a resolution increasing module, i.e. a scaling-up module, to increase a resolution of a video, i.e. an image. In other words, the AI scaler 133 may generate a high-resolution image or a super resolution image from a low-resolution image by up-scaling.

According to an embodiment, a video signal decoded by the video decoder 131 is scaled up by the AI scaler 133 through a AI learning-based process. Here, the AI scaler 133 may be configured to scale up a video signal in accordance with an AI learning-based process used at the encoding terminal of the signal source, i.e., the content providing apparatus.

Specifically, the AI scaler 133 may as shown in FIG. 2, include a plurality of filters Filter 1, Filter 2, . . . , Filter M, Filter N, which can be combined variably, i.e. a flexibly, and process a video signal through the combination of the plurality of filters, thereby adjusting a resolution of a video (or an image). In FIG. 2, Filters 1-N are shown in a serial arrangement followed by a functional block of "Adding." The Adding has two inputs: one fed by Filter N, and one fed by the output of Filter 1. The Adding includes direct algebraic summation of these inputs to product an output.

According to an embodiment, the plurality of filters Filter 1, Filter 2, . . . , Filter N is arranged to make an output of a certain filter (e.g. Filter 1) be used as an input of another filter (e.g. Filter 2) in a serial manner as described above. Taken as a whole filters 1 through N and filter M form a pixel data path for processing a video signal.

According to an embodiment, the video processor 130 may as shown in FIG. 2, further include a pre-processing module 132 for pre-processing a video signal output from the video decoder 131 to be delivered to the AI scaler 133, and a post-processing module 134 for post-processing the video signal output from the AI scaler 133 for enhancing image quality.

According to an embodiment, the pre-processing module 132, the AI scaler 133, and the post-processing module 134 are included in an image-quality chain C as a configuration to improve image quality of an image.

According to an embodiment of the disclosure, the AI scaler 133 may be configured to process a video signal through the first AI learning-based process, or process a video signal through the second AI learning-based process different from the first AI learning-based process, thereby controlling the resolution of a video (or an image). Generally, a video refers to a time sequence of images. An image generally refers to a still image.

Here, the first AI learning-based process corresponds to a process based on machine-learning (ML), and the second AI learning-based process corresponds to a process based on a deep neural network (DNN), i.e. deep learning. DNN is a subset of machine-learning.

That is, an aspect of the disclosure is to provide a display apparatus 100, in which image-resolution control based on machine learning or deep learning is selectively used in processing a video signal based on artificial intelligence (AI) learning, a method of controlling the same, and a recording medium thereof.

Detailed operation of the first AI learning-based process and the second AI learning-based process will be described later.

Meanwhile, there are no limits to the kinds of processes performed by the video processor 130 of the disclosure. For example, the video processor 130 may further include at least one module for performing various processes such as de-interlacing for converting an interlaced type broadcast signal into a progressive type broadcast signal, noise reduction for enhancing image quality, detail enhancement, frame refresh rate conversion, line scanning, etc.

The video processor 130 may be actualized in the form of a group of individual elements, i.e. modules for independently performing such processes, or may be actualized as included in a main system-on-chip (SoC) where many functions are integrated. The main SoC may include at least one processor, for example, a microprocessor or a central processing unit (CPU) as an example of the controller 170 (to be described later).

According to an embodiment, the video processor 130 may be actualized by an image board that various chipsets, a memory, electronic parts, wiring, and the like circuit configuration for performing such processes are mounted to a printed circuit board (PCB). In this case, the display apparatus 100 may include a single image board on which the tuner, the video processor 130, and the controller 170 are provided. Of course, this is merely an example. Alternatively, the tuner, the video processor, and the controller may be provided on a plurality of PCBs connected for communication with each other.

The image signal processed by the video processor 130 is output to the display 140. The display 140 displays an image corresponding to an image signal received from the video processor 130.

According to an embodiment, the display 140 may display a high-resolution image of which a resolution is scaled up by the AI scaler 133 of the video processor 130. There are no limits to the type of the display 140. For example, the display 140 may be achieved by various display types such as liquid crystal, plasma, a light-emitting diode, an organic light-emitting diode, a surface-conduction electron-emitter, a carbon nano-tube, nano-crystal, etc. According to an embodiment, the display 140 includes a display panel for displaying an image, and may further include an additional configuration, e.g. a driver according to the types.

The user input receiver 150 transmits various preset control commands or unrestricted information to the controller 170 in response to a user input.

According to an embodiment, the user input receiver 150 may output a configuration control signal to the controller 170 so that the AI scaler 133 can operate based on either of the first AI learning-based process or the second AI learning-based process.

The user input receiver 150 may include a keypad (or an input panel) including a power key, a numeral key, a menu key and the like buttons provided in a main body of the display apparatus 100.

According to an embodiment, a user input device generates a preset command/data/information/signal for remotely controlling the display apparatus 100 and transmits it to the display apparatus 100. Generally, the input device is separate from the display apparatus 100. The input device includes a remote controller, a keyboard, a mouse, or the like. The input device is capable of receiving a user input and communicates with user input receiver 150.

The remote controller may include a touch sensor for receiving a touch input of a user, and/or a motion sensor for detecting its own motion caused by a user. The input device may include a terminal such as a smartphone, in which a remote-control application is installed, and in this case a touch input of a user may be received through a touch screen of the smartphone.

The input device is included in an external apparatus that performs wireless communication with the display apparatus 100, and the wireless communication may include one or more of Wi-Fi, Bluetooth, IR communication, RF communication, WLAN, Wi-Fi direct, etc.

According to an embodiment, the user input receiver 150 may further include a voice input unit for receiving a voice/sound uttered by a user. The voice input unit may be actualized by a microphone for receiving an audio signal.

The storage 160 may be configured to store various pieces of data of the display apparatus 100. The storage 160 may be actualized by a nonvolatile memory (or a writable memory) which can retain data even though the display apparatus 100 is powered off, and mirror changes. The storage 160 may be provided as at least one among a hard disk drive (HDD), a flash memory, an electrically programmable read only memory (EPROM) or an electrically erasable and programmable ROM (EEPROM).

The storage 160 may further include a volatile memory such as a random access memory (RAM), and the volatile memory may include a dynamic RAM (DRAM) or static RAM (SRAM), of which reading or writing speed for the display apparatus 100 is faster than that of the nonvolatile memory. In other words, a term 'storage' in the disclosure is defined to include not only the nonvolatile memory but also the volatile memory, a cache memory provided in the controller 170, a memory card (e.g. a micro SD card, a memory stick, etc.) mountable to the display apparatus 100 through a connector 111.

Data stored in the storage 160 may for example include not only an operating system (OS) for driving the display apparatus 100 but also various applications, image data, appended data, etc. executable on the OS.

Specifically, the storage 160 may be configured to store a signal or data input/output corresponding to operation of elements under control of the controller 170. The storage 160 may be configured to store a program for controlling the display apparatus 100, a UI related to an application provided by a manufacturer or downloaded from the outside, images for providing the UI, user information, documents, databases, or relevant data.

According to an embodiment, the storage 160 may be configured to store look-up tables (LUT) respectively provided corresponding to the first AI learning-based process and the second AI learning-based process.

The LUT corresponding to the first AI learning-based process includes a first LUT in which filter parameters (hereinafter, referred to as "parameters" or "parameter") generated corresponding to characteristics of images as the first AI learning, i.e. previously performed machine learning results are tabulated. During a run time after the first AI learning-based process is carried out, the AI scaler 133 performs scaling-up for increasing a resolution. The scaling-up includes extracting a parameter set corresponding to characteristics of an input image (based on a video signal) from the first LUT previously generated by the machine learning as described above. In some embodiments, the machine learning includes use of a CNN.

The LUT corresponding to the second AI learning-based process includes a second LUT. Filter parameters in the second LUT are generated as the second AI learning-based process, i.e. previously performed deep learning results are tabulated. In the second LUT, parameters generated regardless of the characteristics of the image are tabulated. After the second AI learning-based process is carried out, the AI scaler 133 performs scaling-up for increasing a resolution. The scaling-up includes extracting a parameter set from the second LUT previously generated by the deep learning as described above.

According to an embodiment, the AI scaler 133 for processing a video signal based on the second AI learning-based process may perform scaling-up by extracting a filter parameter set, which corresponds to a codec or compression characteristic of an image, from the second LUT.

The controller 170 performs control to operate general elements of the display apparatus 100. such control operations. The processor 170 includes at least one universal processor that loads at least a part of a control program from a nonvolatile memory, in which the control program is installed, to a volatile memory, and executes the loaded control program, and may for example be actualized by a CPU, an application processor (AP), or a microprocessor.

The controller 170 may include at least one processor with one or more cores among a single core, a dual core, a triple core, a quad core, or the like multiple core. The processor may include a plurality of processors, for example, a main processor and a sub processor that operates in a sleep mode (during which only standby power is supplied without operation of the display apparatus). Further, the processor, the ROM, and the RAM may be connected to one another through an internal bus.

According to an embodiment, the controller 170 may further include a graphic processing unit (GPU) for graphic-processing.

According to an embodiment, the controller 170 may be actualized as included in the main SoC mounted to the PCB internally provided in the display apparatus 100. Alternatively, the main SoC may further include a video processor 130 for processing a video signal.

The control program may include a program(s) achieved by at least one of a basic input/output system (BIOS), a device driver, an OS, a firmware, a platform, or an application. According to an exemplary embodiment, the application may be previously installed or stored in the display apparatus 100 when the display apparatus 100 is manufactured, or may be installed in the display apparatus 100 on the basis of application data received from the outside when it is required in the future. The application data may for example be downloaded from an external server such as an application market to the display apparatus 100. Such an external server is merely an example of the computer program product according to the disclosure, but not limited thereto.

According to an embodiment, the operation of the controller 170 may be actualized by a computer program stored in the computer program product (not shown) provided separately from the display apparatus 100.

In this case, the computer program product includes a memory in which an instruction corresponding to a computer program is stored, and a processor. The instruction is executed by the processor and controls the AI scaler 133 so that a video signal decoded by the first combination of filters can be processed based on the first AI learning-based process and a video signal decoded by the second combination of filters different from the first combination can be processed based on the second AI learning-based process, thereby performing the operation of the controller 170.

Accordingly, the display apparatus 100 may download therein the computer program stored in a separate computer program product and execute the downloaded computer program, thereby performing the operation of the controller 170.

Further, according to an embodiment, the operation of the controller 170 may be carried out by a computer-readable program stored in the recording medium. The program, i.e. data stored in the recording medium may be directly accessed and executed by the controller 170, or downloaded into the display apparatus 100 via a transmission medium actualized by a wired/wireless network in which the computer systems are connected to one another and executed, thereby carrying out operation.

In the display apparatus 100 according to an embodiment of the disclosure, the controller 170 may as shown in FIG. 2, include a configuration control module 171, an LUT control module 173, and a parameter extraction module 174. According to an embodiment, the controller 170 may further include a codec analysis module 172.

According to an embodiment, the configuration control module 171, the codec analysis module 172, the LUT control module 173, and the parameter extraction module 174 are configured to form a control path for configuring the filters and generating the parameter. In general, the weights used in the filters Filter 1, . . . , Filter N, and Filter M are referred to as parameter or parameters. In general, the term parameter may be understood in the plural.

At least one among the foregoing elements 171, 172, 173 and 174 involved in the controller 170 may be actualized by a hardware module or a computer program described as above. Hereinafter, it will be appreciated that control operations of the AI scaler 133 for a AI learning-based process are carried out by the controller 170 of the display apparatus 100.

Below, a resolution scaling-up process based on the AI learning-based process performed according to an embodiment of the disclosure will be described in detail with reference to the accompanying drawings.

FIGS. 3 to 6 are views for explaining an AI learning-based process according to an embodiment of the disclosure.

Figure 3:
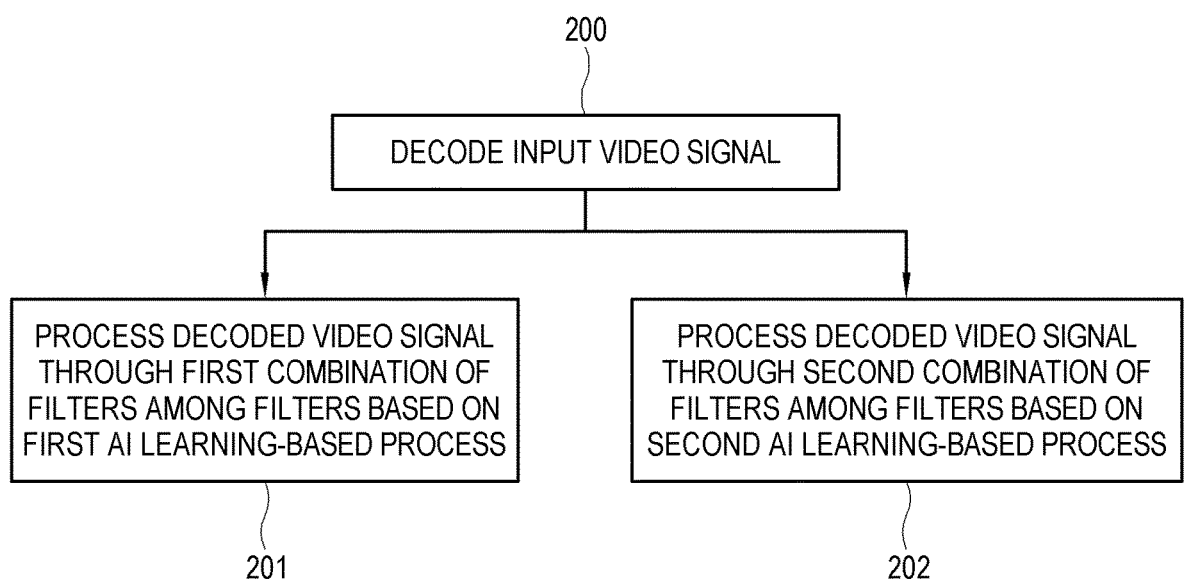
FIGS. 3, 4, 5 and 6 are views for explaining an artificial intelligence (AI) learning-based process according to an embodiment of the disclosure.

As shown in FIG. 3, the video decoder 131 of the display apparatus 100 decodes a video signal received through the signal receiver 110 (200).

The video signal decoded in the operation 200 is processed by the first combination of filters among the plurality of filters of the AI scaler 133 corresponding to the first AI learning-based process (201), or by the second combination of filters different from the first combination among the plurality of filters of the AI scaler 133 corresponding to the second AI learning-based process (202)

Figure 4:
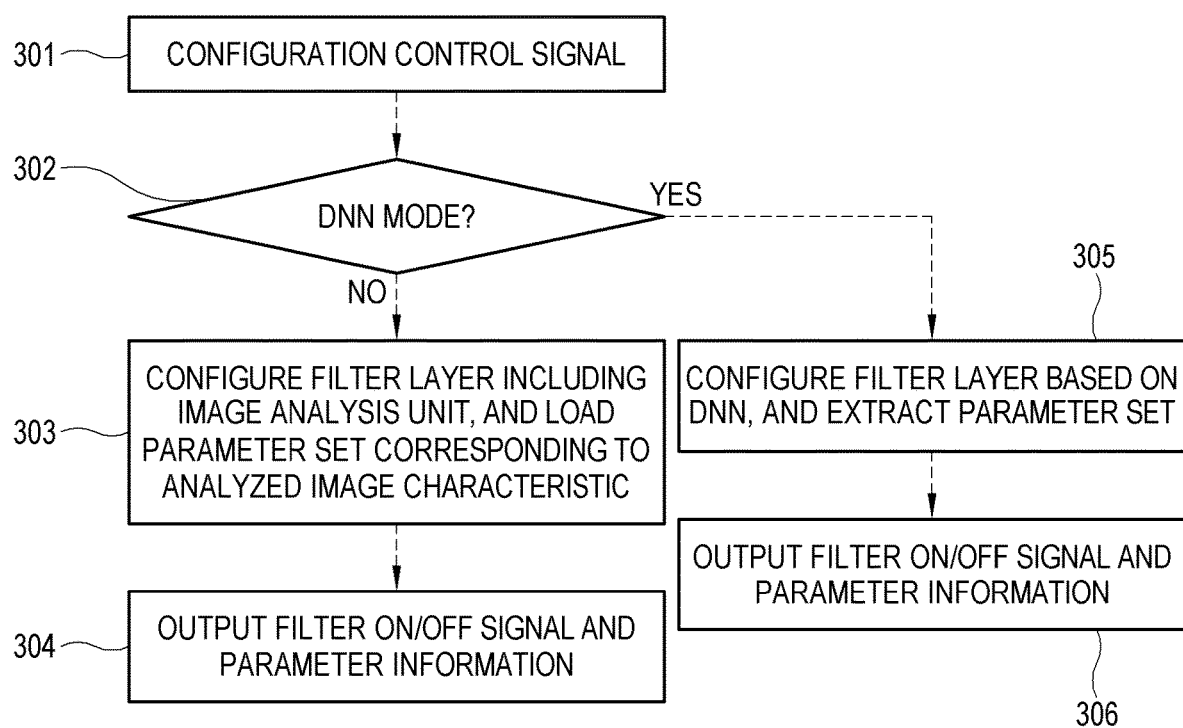

Referring to FIGS. 2 and 4, the configuration control module 171 of the controller 170 in the display apparatus 100 receives a configuration control signal (301).

The configuration control signal refers to an external input signal, which may for example be input to the configuration control module 171 in response to a user's selection made through the user input receiver 150, or input to the configuration control module 171 in response to a signal received from an external apparatus through the communicator 120.

Alternatively, the configuration control signal may be automatically generated in the display apparatus 100 in response to occurrence of a predetermined event.

According to an embodiment, the configuration control signal may be identified while the display apparatus 100 is manufactured or installed for the first time.

The controller 170 may identify the received configuration control signal, and select an operation mode of the AI scaler 133 to correspond to either of the first AI learning-based process or the second AI learning-based process based on an identification result (302).

The configuration control signal indicates the operation mode of the AI scaler 133. Specifically, the configuration control signal may indicate one of an image analysis mode where the AI scaler 133 operates based on the first AI learning-based process, i.e. a machine learning technique, and a DNN mode where the AI scaler 133 operates based on the second AI learning-based process, i.e. a DNN (or deep learning) technique.

The AI scaler 133 operates in either of the image analysis mode or the DNN mode in response to the configuration control signal received as described above. The AI scaler 133 includes the plurality of filters which can be combined variously.

According to an embodiment, the AI scaler 133 processes a video signal through the combinations of filters different according to the operation modes.

In other words, the AI scaler 133 operating in the image analysis mode employs the first combination of filters to process a video signal, and the AI scaler 133 operating in the DNN mode employs the second combination of filters to process a video signal.

According to an embodiment, at least one filter among the plurality of filters of the AI scaler 133 may be shared between the image analysis mode and the DNN mode. For example, the first filter Filter 1 and the second filter Filter 2 shown in FIG. 2 may belong to both the first combination of filters and the second combination of filters.

In the image analysis mode, the first combination of filters is independently controlled based on data (i.e. the filter parameter) generated by previously performing the first AI learning-based process. Here, the filter parameter based on the first AI learning-based process is given corresponding the characteristic of the video signal (or the image), and therefore the first AI learning-based process may be designed based on the machine learning.

In the DNN mode, the second combination of filters is independently controlled based on data (i.e. the filter parameter) generated by previously performing the second AI learning-based process. Here, the filter parameter based on the second AI learning-based process is given regardless of the characteristic of the video signal (or the image), and therefore the second AI learning-based process may be designed based on the deep learning.

The configuration control module 171 outputs a filter control signal for selectively turning on or off each operation of the plurality of filters Filter 1, Filter 2, . . . , Filter M, Filter N as shown in FIG. 2, based on the input configuration control signal, so that the AI scaler 133 can configure a filter layer corresponding to its operation mode.

Further, the configuration control signal input to the configuration control module 171 is transmitted to the LUT control module 173 and the parameter extraction module 174, thereby setting an operation parameter for a filter forming each layer.

The LUT control module 173 may select one of the first LUT and the second LUT, provided in the storage 160, corresponding to the operation mode in response to the configuration control signal.

The parameter extraction module 174 extracts the filter parameter from the selected LUT, and outputs parameter information to each of the plurality of filters Filter 1, Filter 2, . . . , Filter M, Filter N. Here, the parameter extraction module 174 may selectively output the parameter information to the filter, which is turned on by the filter control signal, among the plurality of filters.

Referring to FIG. 4, when the input configuration control signal indicates the image analysis mode, in other words, when it is identified in the operation 302 that the input configuration control signal does not indicate the DNN mode, the filter layer is configured as the first combination of filters including an image analysis unit based on the filter control signal output from the configuration control module 171, and the parameter set is loaded from the LUT based on the parameter information output from the parameter extraction module 174 (303).

In the first combination of filters configured as described above, a certain filter, e.g. the first filter Filter 1 operates as the image analysis unit for analyzing a characteristic of an image, i.e. a video signal, and an image analysis result of the image analysis unit Filter 1 is output to the LUT control module 173, so that the parameter extraction module 174 can load the parameter set corresponding to the characteristic of the analyzed image from the LUT.

Further, the filter control signal, i.e. an on/off signal for the plurality of filters Filter 1, Filter 2, . . . , Filter M, Filter N, and the loaded parameter information are output to each filter (304).

On the other hand, when it is identified in the operation 302 that the input configuration control signal indicates the DNN mode, the filter layer is configured as the second combination of filters based on the filter control signal output from the configuration control module 171, and the parameter set is loaded from the LUT based on the parameter information output from the parameter extraction module 174 (305).

Here, when the AI scaler 133 operates in the DNN mode, the codec analysis module 172 may obtain the codec information of the video signal to be processed from the video decoder 131. A codec analysis result of the codec analysis module 172 is output to the LUT control module 173, so that the parameter set corresponding to the analysis codec can be generated from the LUT in the parameter extraction module 174.

Further, the filter control signal, i.e. the on/off signal for the plurality of filters Filter 1, Filter 2, . . . , Filter M, Filter N, and the loaded parameter information are output to each filter (306).

In the foregoing procedures, the operation of the LUT control module 173 will be described below with reference to FIG. 5.

Figure 5:
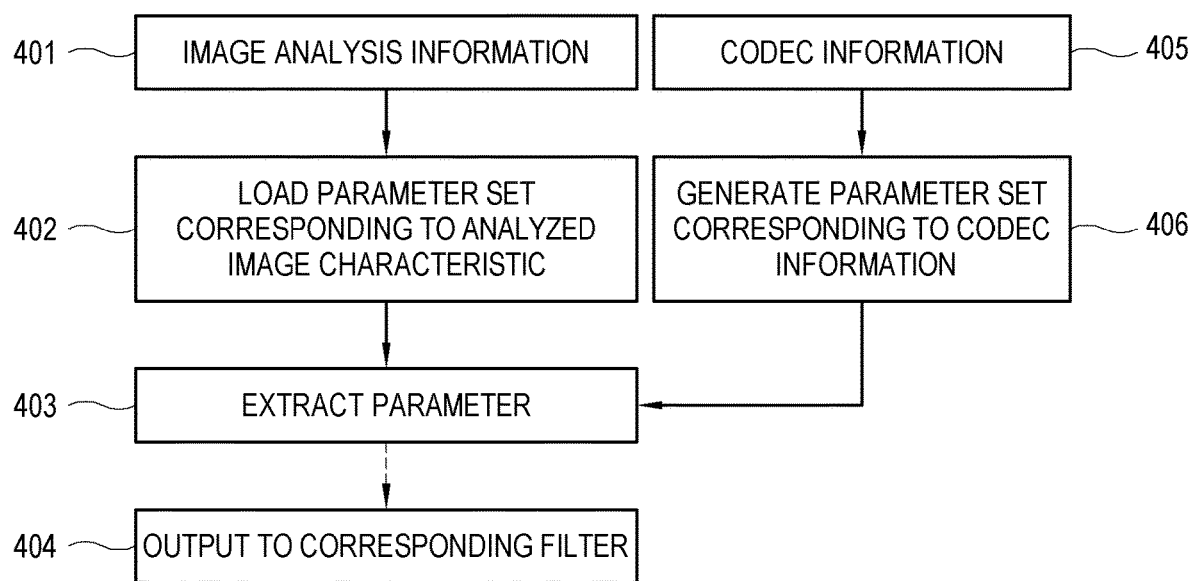
Figure 6:
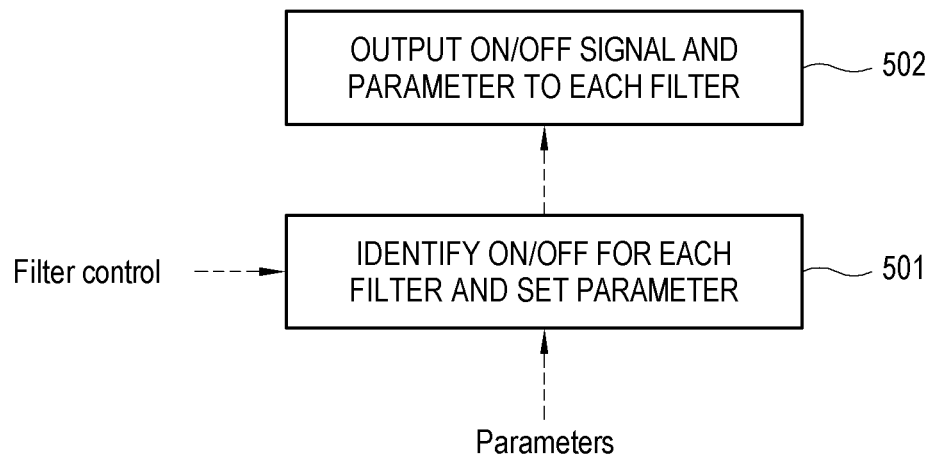

When the AI scaler 133 operates in the image analysis mode, one among the plurality of filters Filter 1, Filter 2, . . . , Filter M, Filter N serves as the image analysis unit, and the image analysis information is, as shown in FIG. 5, output from the image analysis unit (401).

The LUT control module 173 loads the parameter set corresponding to the characteristic of the analyzed image from the LUT, based on the image analysis information output in the operation 401 (402). Here, the LUT control module 173 may selectively load the parameter set corresponding to the characteristic of the analyzed image from the first LUT previously provided corresponding to the image analysis mode based on the mode information indicated by the configuration control signal.

Further, a parameter to be applied to each filter is extracted from the loaded parameter set (403), and the extracted parameter is output to the corresponding filter (404).

On the other hand, when the AI scaler 133 operates in the DNN mode, the codec information is, as shown in FIG. 5, output from the codec analysis module 172 (405). Here, the codec information includes at least one of a codec type or a compression rate.

Specifically, the codec analysis module 172 may generate information according to the codec types or the compression rates based on codec meta information obtained from the video decoder 131, and output the generated information to the LUT control module 173. For example, the codec analysis module 172 may generate information for selecting the LUT based on a quantization parameter (QP) indicating the codec type and the compression rate.

The LUT control module 173 generates the parameter set corresponding to a codec from the LUT, based on codec information output in the operation 401 (406). Here, the LUT control module 173 may generate the parameter set corresponding to the identified codec from the second LUT previously provided corresponding to the DNN mode based on information about the mode indicated by the configuration control signal.

Further, the parameter to be applied to each filter is extracted from the generated parameter set (403), and the extracted parameter is output to the corresponding filter (404). In the foregoing procedures, the operation of outputting the filter control signal will be described below with reference to FIG. 6.

As described with reference to FIGS. 4 and 5, it is identified whether to turn on or off each filter as the configuration control module 171 generates a filter control signal to be output to each of the plurality of filters Filter 1, Filter 2, . . . , Filter M, Filter N based on the configuration control signal, and the parameter for each of the plurality of filters Filter 1, Filter 2, . . . , Filter M, Filter N is set as the parameter extraction module 174 extracts the filter parameter from the LUT (501).

Further, the on/off signal for each filter, i.e. each channel for the filter layer and the parameter in the operation 501 are output (502). The filter that receives the off signal operates in a bypass mode.

According to an embodiment of the disclosure, through the foregoing procedures, the AI scaler 133 is configured with the plurality of filters, which are combined corresponding to one of the image analysis mode for operation based on the first AI learning-based process i.e. the machine learning and the DNN mode for operation based on the second AI learning-based process, i.e. the deep learning.

Figure 7:
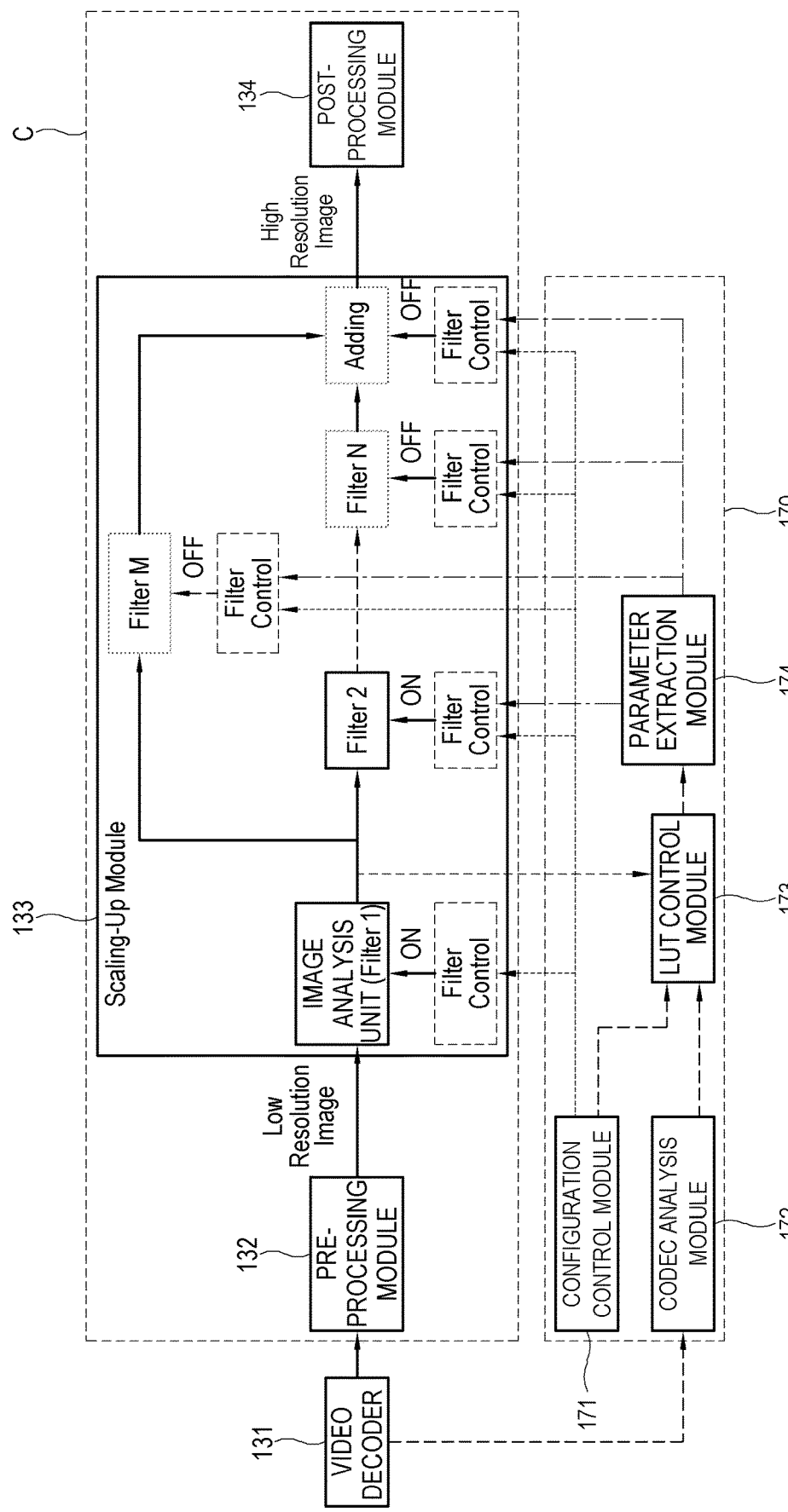
FIG. 7 is a block diagram of an AI scaler that includes a first combination of filters for a first AI learning-based process according to an embodiment of the disclosure.
Figure 8:
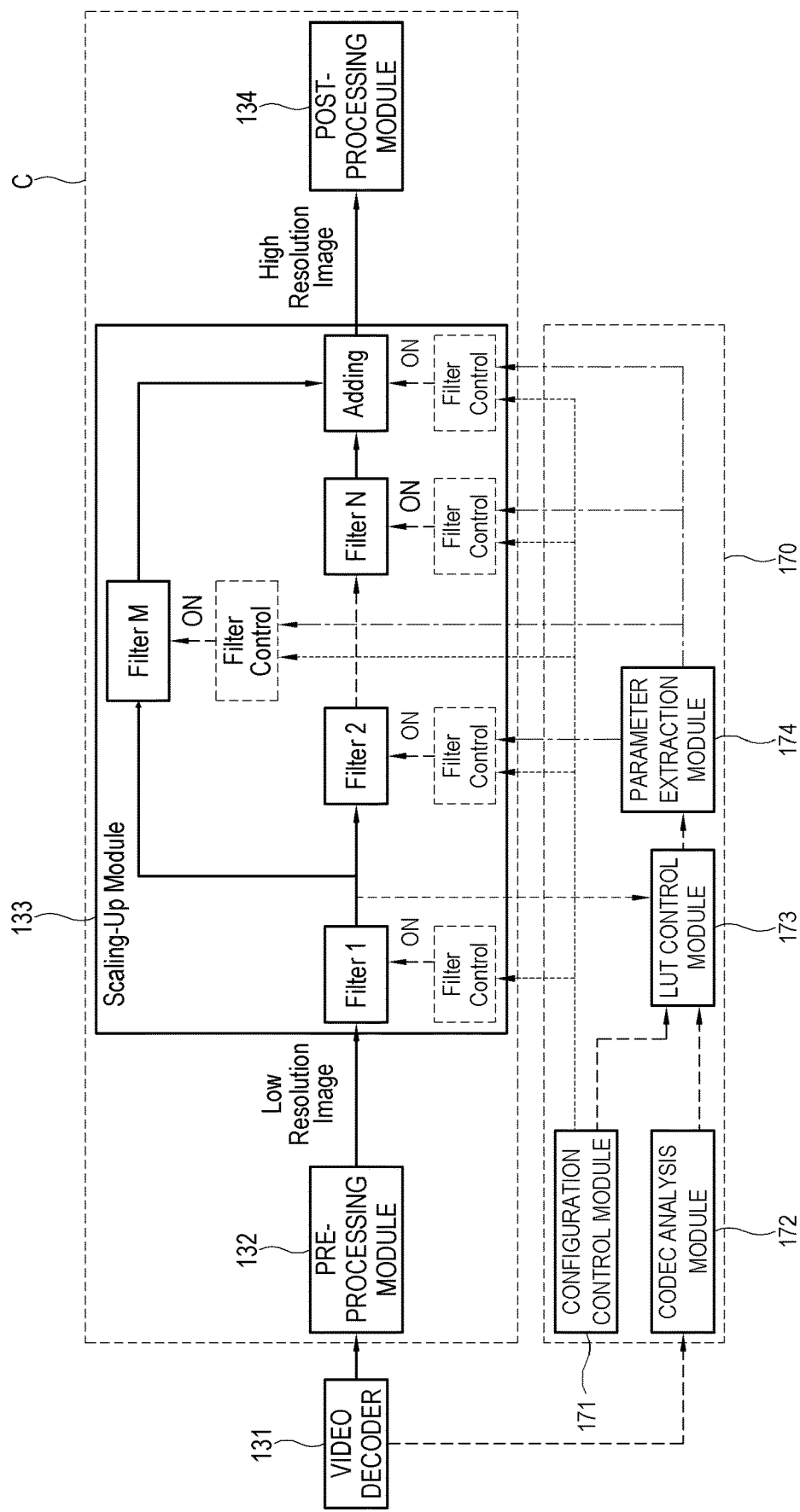
FIG. 8 is a block diagram of an AI scaler that includes a second combination of filters for a second AI learning-based process according to an embodiment of the disclosure.

FIG. 7 is a block diagram of an AI scaler that includes a first combination of filters for a first AI learning-based process according to an embodiment of the disclosure, and FIG. 8 is a block diagram of an AI scaler that includes a second combination of filters for a second AI learning-based process according to an embodiment of the disclosure.

As shown in FIG. 7, in the AI scaler 133 that includes the first combination of filters for the first AI learning-based process, one among the plurality of filters Filter 1, Filter 2, . . . , Filter M, Filter N, in other words, the first filter Filter 1 serves as the image analysis unit, and another one, i.e. the second filter Filter 2 serves to generate a high resolution image of which a resolution is scaled up.

The image analysis result output from the image analysis unit Filter 1 is input to the LUT control module 173, and the LUT control module 173 reads a parameter corresponding to the characteristic of the analyzed image from the first LUT, so that the parameter extraction module 174 can output the corresponding parameter to the second filter Filter 2.

The second filter Filter 2 may for example, generate a high resolution image by interpolation based on the extracted parameter.

As shown in FIG. 8, the AI scaler 133 including the second combination of filters for the second AI learning-based process has a multi-filter structure configured as a plurality of layers.

In the AI scaler 133 including the second combination of filters, each of the filters Filter 1, Filter 2, . . . , Filter M, Filter N is set with the parameter extracted from the second LUT previously generated by DNN (or deep learning)-based training. A low-resolution input image, i.e. a video signal is automatically scaled up into a high resolution image while being processed by the plurality of filters Filter 1, Filter 2, . . . , Filter M, Filter N set by the corresponding parameter.

As described above, in the AI scaler 133 including the second combination of filters, the parameter is set for each individual filter, so that the multi-layers can be independently controlled.

According to an embodiment, when the controller 170 further includes the codec analysis module 172, each of the filters Filter 1, Filter 2, . . . , Filter M, Filter N may be set with the parameter corresponding to the codec, based on the codec information obtained from the video decoder 131.

According to an embodiment of the disclosure, the display apparatus 100 makes use of the codec information in setting the parameter for each filter Filter 1, Filter 2, . . . , Filter M, Filter N, and it is thus advantageous to scale up a resolution while mirroring even image compression characteristics according to the codec type, the compression rate, etc.

Below, detailed operation of each filter in the AI scaler 133 configured with the first combination of filters or the second combination of filters will be described with reference to the accompanying drawings.

Figure 9:
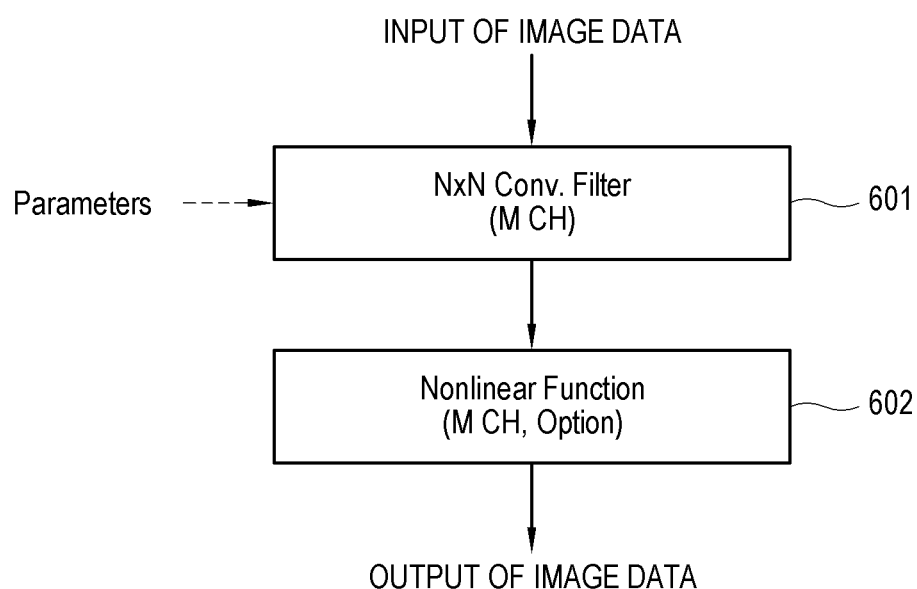
FIGS. 9 and 10 are views for explaining operation of a filter in a deep neural network (DNN) mode.
Figure 10:
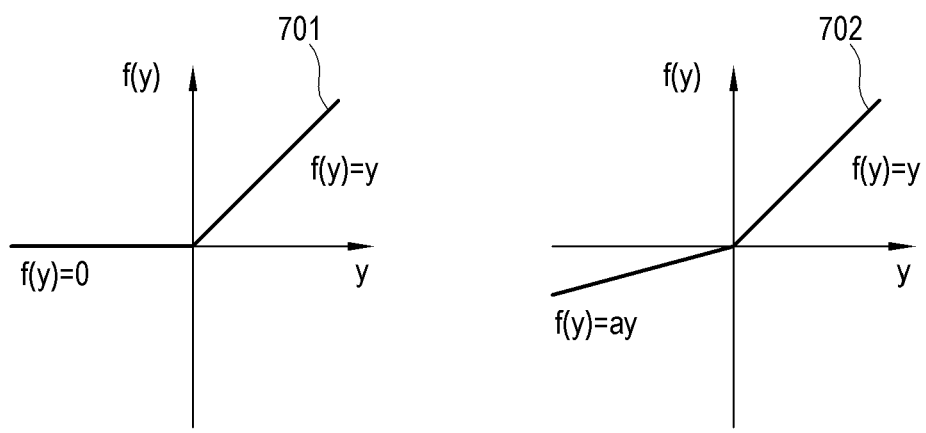

FIGS. 9 and 10 are views for explaining operation of a filter in the DNN mode.

As shown in FIG. 9, each filter in the DNN mode includes a convolution filter 601 and a non-linear function 602.

According to an embodiment, various convolution filters 601 of 1×1~N×N are possible, and may for example be given in the form of 1×1, 3×3, and 5×5 filters. Alternatively, the convolution filter 601 may be configured with M channels (CH).

The convolution filter 601 includes a register in which parameters (e.g. weight parameters) input and set from the outside are stored, and a convolution operator. The convolution operator may perform a convolution operation by multiplying the parameter read from the register by input image data X0, X1, X2 . . . Xn, and adding up the multiplication results. The non-linear function 602 may as shown in FIG. 10, employ various non-linear functions 701 and 702.

As shown in FIG. 9, each filter including the convolution filter 601 and the non-linear function 602 receives image data and output the image data, of which a resolution is scaled up, while operating based on a convolutional neural network (CNN) algorithm. A low-resolution image, i.e. an input video signal is adjusted in resolution as scaled up while passing through each filter, and thus generated as a high resolution image.

Figure 11:
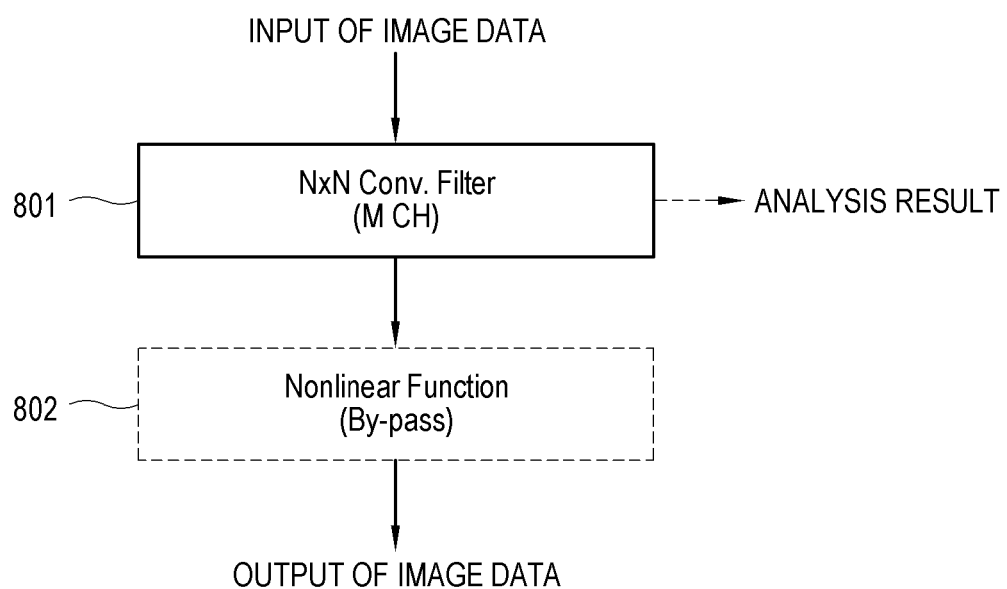
FIGS. 11 and 12 are views for explaining operation of a filter in an image analysis mode.
Figure 12:
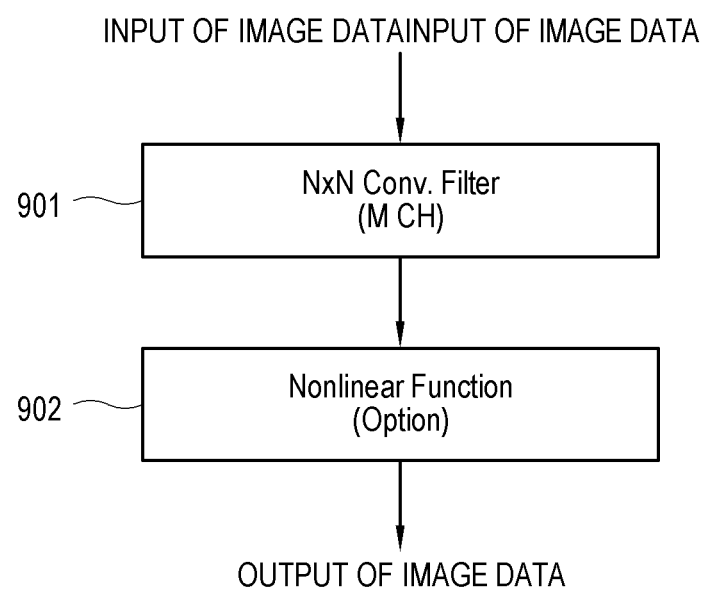

FIGS. 11 and 12 are views for explaining operation of a filter in an image analysis mode.

FIG. 11 illustrates operation of a filter serving as the image analysis unit, for example, the first filter Filter 1 shown in FIG. 7.

As shown in FIG. 11, when the filter carries out an image analysis function, input image data is multiplied by a convolution filter of N×N to thereby obtain output data (801). The obtained output data is output as an image analysis result to the LUT control module 173. Alternatively, the convolution filter may include M channels CH.

When a certain filter performs the image analysis function, the next process, i.e. the non-linear function does not operate and bypasses the input image data (802). Therefore, the input image data is output skipping over the filter, and thus adjusted by the next filter, for example, the second filter Filter 2 of FIG. 7.

FIG. 12 illustrates operation of a filter for increasing a resolution (i.e. scaling-up), for example, the second filter Filter 2 shown in FIG. 7.

As shown in FIG. 12, the filter for performing scaling-up), for example, the second filter Filter 2 shown in FIG. 7 operates like the filter in the DNN mode described with reference to FIG. 9. In other words, the filter receives the image data and outputs the processed image data, so that a low resolution image, i.e. a video signal can be generated into a high resolution image of which a resolution is scaled up.

Meanwhile, according to another embodiment of the disclosure, when the AI scaler 133 operates in the image analysis mode, at least one among unused filters may be employed to perform post-processing.

Figure 13:
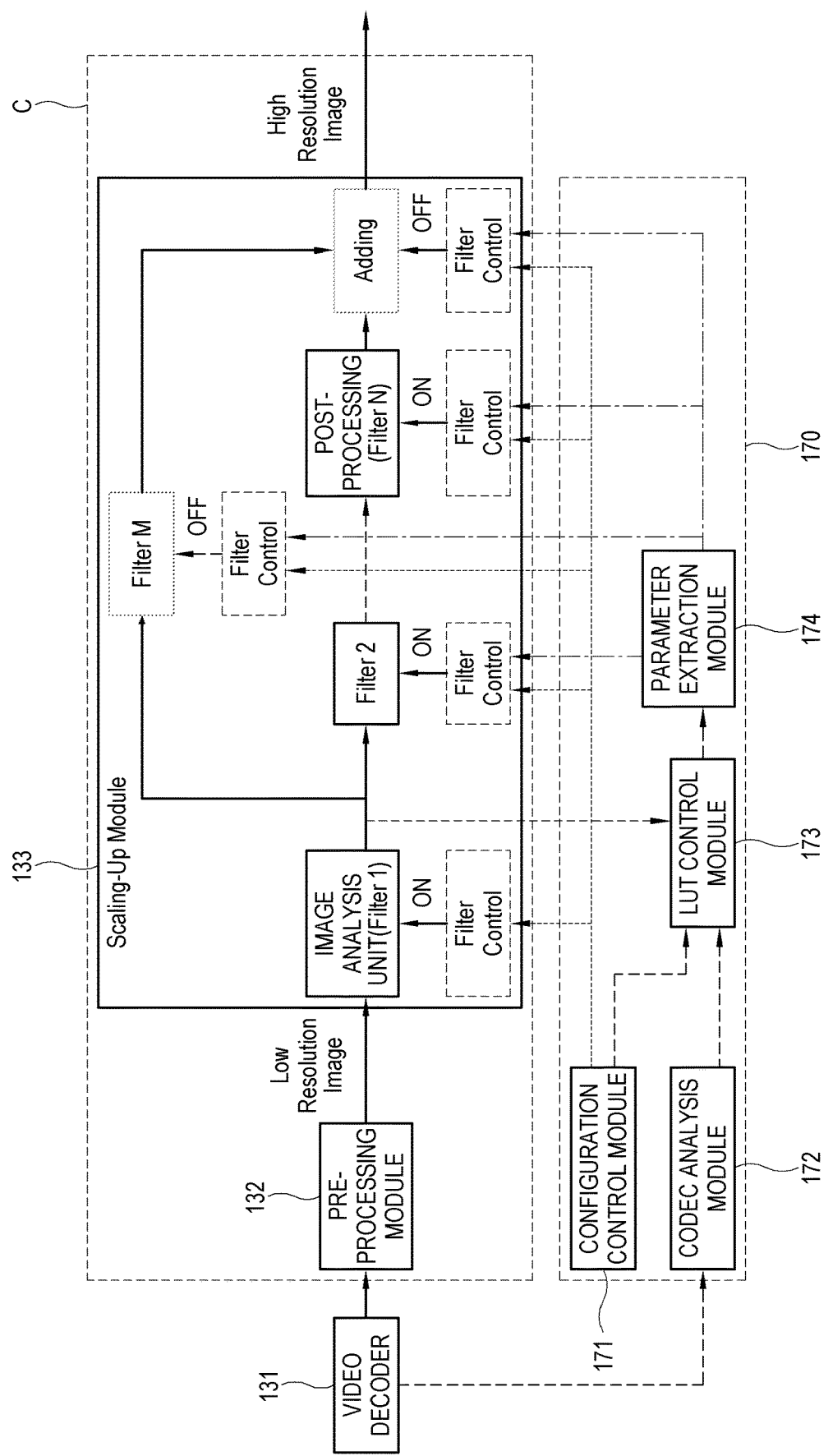
FIG. 13 is a block diagram showing a detailed configuration for processing a video signal in a display apparatus according to another embodiment of the disclosure.

FIG. 13 is a block diagram showing a detailed configuration for processing a video signal in a display apparatus according to another embodiment of the disclosure.

As shown in FIG. 13, a third combination of filters among the plurality of filters Filter 1, Filter 2, . . . , Filter M, Filter N of the AI scaler 133 may be used in processing a video signal.

The third combination of filters may be achieved by adding one or more filters for post-processing to the first combination of filters shown in FIG. 7.

Specifically, in the third combination of filters, a certain filter, e.g. the first filter Filter 1 serves as the image analysis unit for analyzing a characteristic of an image, i.e. a video signal, and another filter, e.g. the second filter Filter 2 serves to generate a high resolution image of which a resolution is adjusted as scaled up. Further, as shown in FIG. 13, at least one among the plurality of filters . . . , Filter M, Filter N other than Filter 1 and Filter 2 for example, the Nth filter Filter N may carry out post-processing for enhancing image quality of an image.

Here, the post-processing includes various processes for noise reduction, detail enhancement, and the like for improving image quality, and there are no limits to the kinds of post-processing.

The foregoing Nth filter Filter N is configured to actually perform at least a part of the function of the post-processing module 134 shown in FIG. 2. according to an embodiment In the display apparatus 100 according to this embodiment of the disclosure, filters not used in the image analysis mode, i.e. unused resources among the plurality of filters, of which various combinations are possible, of the AI scaler 133 are employed in the post-processing, thereby improving resource utilization and having an effect on enhancing image quality of an image.

As described above, there are provided a display apparatus and a method of controlling the same according to the disclosure, in which an AI scaler includes a plurality of filters, of which various combinations are possible, so that resolution control based on a machine learning process and resolution control based on a deep learning process can be selectively carried out.

Further, there are provided a display apparatus and a method of controlling the same according to the disclosure, in which a parameter of each filter is set based on codec information, thereby controlling a resolution while mirroring even image compression characteristics according to a codec type, a compression rate, and the like.

Further, there are provided a display apparatus and a method of controlling the same according to the disclosure, in which unused filters are used in performing post-processing for image quality enhancement, thereby improving resource utilization of unused resources and having an effect on enhancing image quality of an image.

Although a few exemplary embodiments have been shown and described, it will be appreciated by those skilled in the art that changes may be made in these exemplary embodiments without departing from the principles and spirit of the embodiments provided herein, the scope of which is defined in the appended claims and their equivalents.

What is claimed is:

1. A display apparatus comprising:
a display;
a communication interface configured to receive a video signal from an external device;
a video decoder configured to decode the video signal;
a controller; and
an artificial intelligence (AI) scaler,
wherein the controller is configured to perform a control with respect to a resolution of an image, the AI scaler comprising a first filter configured to be selectively turned on or off,
wherein the control comprises:
turning off the first filter based on first external information being received from the external device, by the controller controlling the video signal to bypass the first filter, and
turning on the first filter based on second external information being received from the external device, whereby the first filter processes the video signal based on a weight parameter, wherein the weight parameter is set by an AI learning.

2. The display apparatus according to claim 1, further comprising a storage configured to store a lookup table, wherein the lookup table has been generated by performing the AI learning,
wherein the controller is further configured to extract a parameter from the lookup table and provide the parameter to the first filter.

3. The display apparatus according to claim 1, wherein the AI scaler comprises a plurality of filters comprising the first filter, the plurality of filters being provided to make an output of a certain filter be used as an input of another filter, each filter of the plurality of filters being selectively turned on or off based on a control signal.

4. The display apparatus according to claim 3, wherein the AI scaler is configured to selectively operate in one of a first operation mode employing a first combination of the plurality of filters and a second operation mode employing a second combination of the plurality of filters.

5. The display apparatus according to claim 4, wherein, based a reception of the control signal indicating the first operation mode, the AI scaler is configured to include a first filter layer corresponding to the first combination of the plurality of filters by selectively turning on or off each of the plurality of filters, the first combination of the plurality of filters comprising a second filter configured to analyze an image characteristic of the video signal and a third filter being set with a parameter corresponding to the analyzed image characteristic.

6. The display apparatus according to claim 4, wherein, based on a reception of the control signal indicating the second operation mode, the AI scaler is configured to have a second filter layer corresponding to the second combination of the plurality of filters by selectively turning on or off each of the plurality of filters, the second combination of the plurality of filters comprising a second plurality of filters respectively being set with a plurality of parameters set by a second learning.

7. The display apparatus according to claim 4, wherein the controller is further configured to perform the control the resolution of the image of the video signal by configuring one of the first combination of the plurality of filters and the second combination of the plurality of filters.

8. The display apparatus according to claim 3, wherein a second filter of the plurality of filters is turned on, the second filter is configured to perform post-processing with respect to the image, and the post-processing corresponds to at least one of noise reduction and detail enhancement.

9. A method of controlling a display apparatus, comprising:
receiving, by a communication interface, a video signal from an external device;
decoding, by a video decoder, the video signal;
controlling, by a controller, a resolution of an image displayed on a display by processing the decoded video signal, wherein the controller is configured to control an artificial intelligence (AI) scaler, and the AI scaler comprises a first filter configured to be selectively turned on or off;
turning off the first filter based on first external information being received from the external device, wherein the turning off is performed by the controller controlling the video signal to bypass the first filter; or
i) turning on the first filter based on second external information being received from the external device, and ii) processing, by the first filter, the video signal based on a weight parameter, wherein the weight parameter is set by an AI learning.

10. The method according to claim 9, further comprising:
storing a lookup table, wherein the lookup table has been generated by performing the AI learning;
extracting a parameter from the lookup table; and
providing the parameter to the first filter.

11. The method according to claim 9, wherein the AI scaler comprises a plurality of filters comprising the first filter, the plurality of filters being provided to make an output of a certain filter be used as an input of another filter,
the method further comprising selectively turning on or turning off each filter of the plurality of filters based on a control signal.

12. The method according to claim 11, further comprising selectively operating in one of a first operation mode employing a first combination of the plurality of filters and a second operation mode employing a second combination of the plurality of filters.

13. The method according to claim 12, further comprising:
receiving a control signal indicating the first operation mode; and
including a first filter layer corresponding to the first combination of the plurality of filters by selectively turning on or off each of the plurality of filters, the first combination of the plurality of filters comprising a second filter configured to analyze an image characteristic of the video signal and a third filter being set with a parameter corresponding to the analyzed image characteristic.

14. The method according to claim 12, further comprising:
receiving a control signal indicating a second operation mode; and
including a second filter layer corresponding to the second combination of the plurality of filters by selectively turning on or off each of the plurality of filters, the second combination of the plurality of filters comprising a second plurality of filters respectively being set with a plurality of parameters set by a second learning.

15. The method according to claim 12, further comprising controlling a resolution of an image of the video signal by configuring one of the first combination of the plurality of filters and the second combination of the plurality of filters.

16. The method according to claim 11, further comprising turning on a second filter of the plurality of filters; and
performing post-processing with respect to the image, wherein the post-processing corresponds to at least one of noise reduction and detail enhancement.

* * * * *